United States Patent
Baba et al.

(10) Patent No.: US 6,632,026 B2
(45) Date of Patent: Oct. 14, 2003

(54) METHOD OF POLISHING OPTICAL FIBER CONNECTOR

(75) Inventors: Tetsuya Baba, Tachikawa (JP); Jun Tamura, Fussa (JP); Vuong Van Bang, San Jose, CA (US)

(73) Assignee: Nihon Microcoating Co., Ltd., Tokyo (JP)

(*) Notice: Subject to any disclaimer, the term of this patent is extended or adjusted under 35 U.S.C. 154(b) by 0 days.

(21) Appl. No.: 09/939,198

(22) Filed: Aug. 24, 2001

(65) Prior Publication Data

US 2003/0039452 A1 Feb. 27, 2003

(51) Int. Cl.$^7$ .................................. G02B 6/00
(52) U.S. Cl. ....................................... 385/85
(58) Field of Search ........................ 385/15, 53–94

(56) References Cited

U.S. PATENT DOCUMENTS

| | | | | |
|---|---|---|---|---|
| 4,310,974 A | * | 1/1982 | Gdovin et al. | 434/42 |
| 5,135,590 A | * | 8/1992 | Basavanhally et al. | 156/64 |
| 5,337,384 A | * | 8/1994 | Basavanhally et al. | 385/54 |
| 5,345,529 A | * | 9/1994 | Sizer et al. | 385/147 |
| 5,566,262 A | * | 10/1996 | Yamane et al. | 385/33 |
| 5,815,621 A | * | 9/1998 | Sakai et al. | 385/80 |
| 6,236,787 B1 | * | 5/2001 | Laughlin | 385/52 |
| 6,238,100 B1 | * | 5/2001 | Sasaki et al. | 385/59 |
| 6,276,842 B1 | * | 8/2001 | Xu et al. | 385/85 |
| 6,393,187 B1 | * | 5/2002 | Engelberth et al. | 385/115 |
| 6,416,236 B1 | * | 7/2002 | Childers et al. | 385/84 |
| 6,470,123 B1 | * | 10/2002 | Sherman et al. | 385/115 |
| 2001/0051028 A1 | * | 12/2001 | Gutierrez et al. | 385/85 |
| 2002/0159729 A1 | * | 10/2002 | DiMascio et al. | 385/120 |

* cited by examiner

*Primary Examiner*—Akm Enayet Ullah
*Assistant Examiner*—Michelle R. Connelly-Cushwa
(74) *Attorney, Agent, or Firm*—Beyer Weaver & Thomas LLP

(57) ABSTRACT

Optical fiber connectors each with a plurality of optical fibers protruding from the front surface of a main body by improved and uniform distances are produced by being subjected to an etching step in which a textile pad free of abrading particles and a slurry containing abrading particles of a relatively larger size are used and thereafter to a final fine polishing step in which a polishing pad with a porous and compressive sponge-like material without affixed abrading particles and a slurry of another kind containing relatively smaller abrading particles are used. The sponge-like material may be polyurethane and is required to have hardness and pores with sizes within specified ranges.

15 Claims, 2 Drawing Sheets

# METHOD OF POLISHING OPTICAL FIBER CONNECTOR

BACKGROUND OF THE INVENTION

This invention relates to a method of polishing optical fiber connectors. More particularly, this invention relates to a polishing method as a part of a production process for connectors each with a plurality of optical fibers protruding from a front surface of a main body and a pad which is used in such a polishing process such that the variations in the length of protrusion can be reduced and the protruding optical fibers will each have a flatter front surface.

Optical fiber connectors of this type have been known, and it has also been known to polish such optical fiber connectors by using a fibrous material such as comprising nylon and polyethylene with abrasive particles attached thereto and without using a slurry. This method, however, is less than satisfactory for many reasons such that the process takes too long a time, that the finished surfaces tend to be scratched and that sufficient protrusions cannot be obtained. More significantly, such prior art methods have not been able to sufficiently control the protrusions of the individual optical fibers such that the variations among the protrusions of the individual fibers were relatively large and the tips of the protruding optical fibers were not sufficiently even, smooth or flat, tending to become thinner near the front end.

SUMMARY OF THE INVENTION

It is therefore an object of this invention to provide a new method of polishing optical fiber connectors with a plurality of optical fibers therethrough such that the optical fibers protrude from the front surface of a main body by an improved length of 1–3 microns and preferably longer with reduced variations and have flatter, smoother and more even front surfaces than was possible with prior art methods.

A method embodying this invention, with which the above and other objects can be accomplished, may be characterized as comprising the steps of carrying out a preferential etching step of the front surface by using a textile pad free of abrading particles affixed thereto and a slurry containing abrading particles of a relatively larger size and thereafter polishing front portions of the optical fibers with a polishing pad with a porous and compressive sponge-like material without abrading particles affixed thereto and a slurry of another kind containing relatively smaller abrading particles. Such a sponge-like material may comprise polyurethane and is required to have hardness within a specified range. By a method of this invention with the use of a polishing pad as described above, optical fiber connectors with a plurality of fibers can be produced with the optical fibers protruding by longer distances and more uniformly, and having smoother front surfaces.

DETAILED DESCRIPTION OF THE INVENTION

Figure 1:
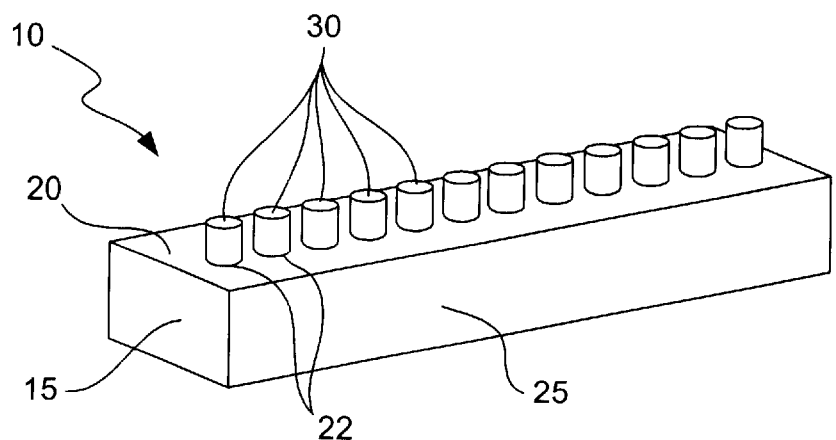
FIG. 1 is a greatly enlarged schematic perspective view of an optical fiber connector produced by a method embodying this invention.

FIG. 1 shows schematically an example of optical fiber connector 10 produced by a method embodying this invention. The optical fiber connector 10 is characterized as comprising a main body 15 (say, of a plastic material containing glass particles for providing desired physical characteristics), having a flat front surface 20, an oppositely facing back surface 25 and a plurality of optical fibers 30 which extend through throughholes 22 provided through the main body 15 from the back surface 25 to the front surface 20, protruding from the front surface 20 by a specified length which may be in the range of 1–3 microns or greater and being secured in the respective throughholes 22 by epoxy (not shown). Although twelve optical fibers 30 are shown linearly arranged through the main body 15, neither the number of the optical fibers 30 nor their arrangement is intended to limit the scope of this invention. On the other hand, it is to be remembered that the present invention is particularly useful for connectors with many more than 2 optical fibers passing through and supported by a main body.

Figure 2:
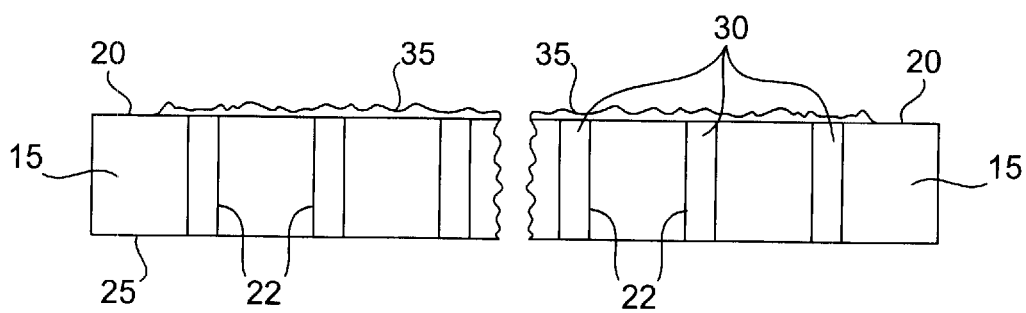
FIG. 2 is a schematic sectional side view of the optical fiber connector of FIG. 1 at a stage during a course of its production before epoxy is removed.

FIG. 2 shows the optical fiber connector 10 at one stage during the course of its production after the optical fibers 30 have each been secured inside respective one of the throughholes 22 by epoxy 35. A method of producing optical fiber connectors as shown in FIG. 1 from the stage shown in FIG. 2 may be described as including the following four steps, that is, the steps of removing the epoxy, rough polishing, preferential removal of the main body material and a final fine polishing. For carrying out all four of these steps, use may be suitably made of a polishing machine of a known kind capable of loading a plurality of target objects to be polished and provided with a rotary disc and a mechanism for causing each of these loaded target objects to constantly come into contact with a new portion of a polishing pad removably attached to the rotary disc.

Figure 3:
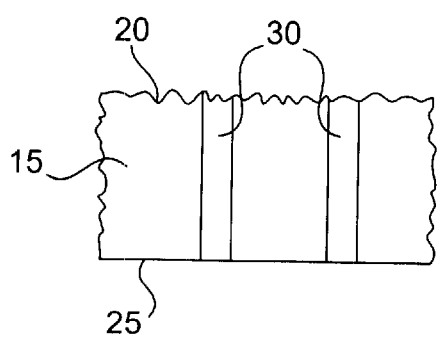
FIG. 3 is a schematic sectional side view of the optical fiber connector of FIG. 2 after the first two steps of a polishing method of this invention have been carried out.

The first two of the four steps referred to above are carried out in conventional ways and hence will not be described in detail. The first step of epoxy removal may be carried out, for example, by using a polishing film with abrading particles of silicon carbide with diameters about 16 microns on the rotary disc of such a polisher. The second step of rough polishing may be carried out, for example, by using a polishing film with abrading particles of silicon carbide with diameters about 5 microns. After these first two steps have been carried out, the optical fiber connector 10 will look as shown in FIG. 3, with the front surface 20 of the main body 15 roughly flat and the front surfaces of the optical fibers 30 substantially flush with this substantially flattened front surface 20 of the main body 15.

Figure 4:
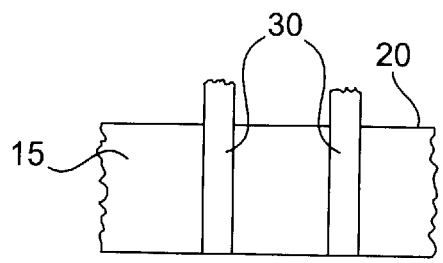
FIG. 4 is a schematic sectional side view of the optical fiber connector of FIG. 2 after the third step of the polishing method of this invention has been carried out.

The third step is for preferentially etching off the front surface 20 of the main body 15 relative to the optical fibers 30 such that the optical fibers 30 remain protruding from the front surface 20, as shown in FIG. 4. For this preferential etching of the front surface 20 in the third step, use is made of a pad of textile material such as nylon or polyethylene without any abrading particles affixed thereonto. For the etching, a slurry containing abrading particles with average diameter in the range of 1–4 microns in an amount of 20–40% (hereinafter also referred to as "the first slurry") is used together with the textile pad. The abrading particles may comprise aluminum oxide or silicon carbide. The use of such a textile pad and such a slurry can effectively etch the front surface 20 of the main body 15 without unnecessarily etching side surfaces of the optical fibers 30. In other words, the optical fibers 30 do not become pointed towards the tip as they tend to become by a prior art method of preferential etching.

Figure 5:
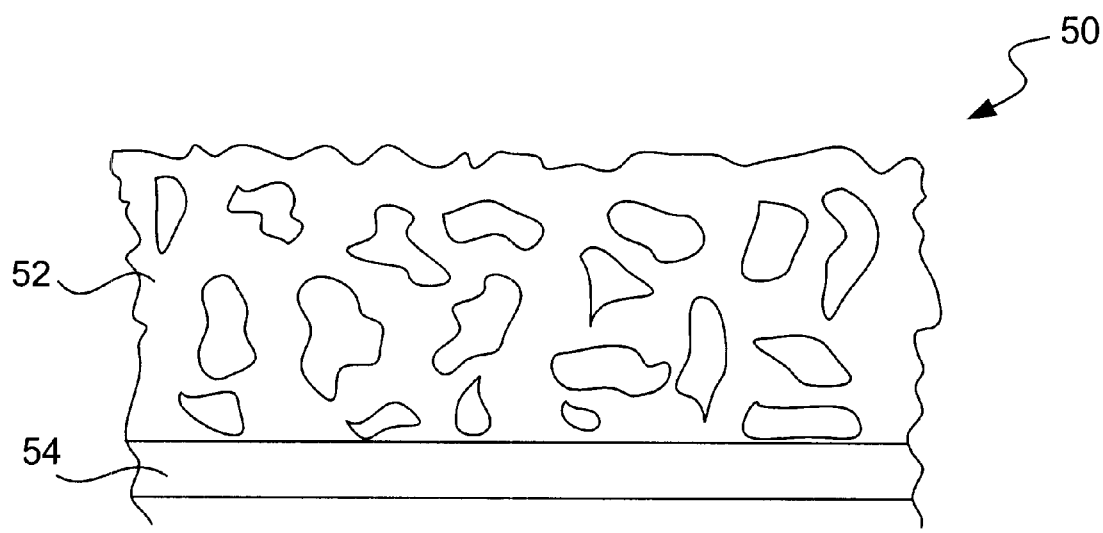
FIG. 5 is a schematic sectional side view of a polishing pad used in the fourth step of the polishing method of this invention.

The fourth step is for final fine polishing for making the front surfaces of the protruding optical fibers 30 flatter, smoother and more even. For this process, use is made of a polishing pad 50 according to this invention, as shown schematically in FIG. 5. This polishing pad 50 is characterized as comprising a layer of sponge-like material 52 with thickness in the range of 300–1500 microns attached to an adhesive tape 54. The sponge-like material may be porous polyurethane with hardness in the range of 20–80 duro, having pores with sizes in the range of 20–100 microns.

Figure 6:
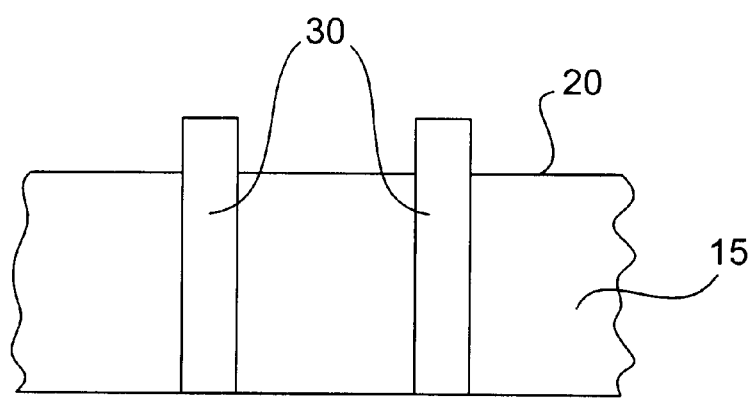
FIG. 6 is a schematic sectional side view of the optical fiber connector of FIG. 2 after the fourth step of the polishing method of this invention has been carried out.

In terms of compressibility and elasticity, it may be characterized as having compressibility in the range of 5–40% and elasticity in the range of 30–120%. The compressibility and elasticity are the values obtained from a sample piece of a suitable size by measuring its thickness $T_0$ while compressing it with an initial load of 80 g, further adding an extra load of 800 g for 5 minutes and measuring its thickness $T_1$ afterward, removing this total load of 880 g and thereafter subjecting it to the initial load of 80 g for 30 seconds to measure its thickness $T_0'$ again. The compressibility is calculated as $100(T_0-T_1)/T_0$ and the compressive elasticity is calculated as $100(T_0'-T_1)/(T_0-T_1)$. The polishing pad 50 itself does not include any abrading particles. For the final fine finishing process, use is additionally made of a slurry of another kind containing abrading particles (such as cerium oxide, diamond and aluminum oxide particles) with an average diameter in the range of 0.1–2.0 microns in an amount of about 20% (hereinafter also referred to as "the second slurry"). The use of such a pad of a sponge-like material without abrading particles affixed thereto and a slurry of the aforementioned property can effectively flatten the front surfaces of the optical fibers 30 left protruding from the front surface 20 of the main body 15, as shown schematically in FIG. 6. Test experiments carried out by the present inventors showed that optical fibers connectors with optical fibers protruding from the main body by an average length in the range of 1–4 microns could be obtained by a method embodying this invention, with variations in the length of protrusion less than 0.5 microns and the difference in the length of protrusion between mutually adjacent pair of optical fibers less than 0.2 microns.

The surface roughness of the optical fibers 30 thus polished was measured by means of an atomic force microscope (produced by Digital Instrument, Inc). The surface roughness $R_a$ was 1.9 nm (at scan size 50×50 microns). As a comparison test, an optical fiber connector with only two optical fibers passing through a main body was polished by a conventional method. The surface roughness $R_a$ was 5.2 nm (at scan size 50×50 microns). This shows clearly that a method according to this invention can polish a multi-fiber optical fiber connector (even of a kind with many more than two optical fibers therethrough) such that the polished optical fibers protrude from the front surface of the main body by an increased length (more than 1 micron and even more than 3 microns), that the front surfaces of the protruding optical fibers have reduced surface roughness and that the front surface of the main body is left with less visible scratches.

The invention was described above by way of only one example and as applied to an optical connector of only one kind, but this example is not intended to limit the scope of the invention. Many modifications and variations are possible within the scope of the invention. For example, the number and arrangement of optical fibers through a main body of each of the connectors to be polished do not limit the scope of the invention. No example of polishing machine was disclosed but any commonly available machine, say, with a rotary disc, may be used in connection with this invention. The front surfaces of the optical fibers need not be polished so as to be perpendicular to the direction of their extension. In other words, the present invention applies equally well to the polishing of so-called angled fibers with front surfaces sloped with respect to the direction of their extension. In summary, all such modifications and variations that may be apparent to a person skilled in the art are considered to be within the scope of this invention.

What is claimed is:

1. A method of polishing an optical fiber connector, said method comprising the steps of:
   providing an optical fiber connector which comprises a main body having a front surface, an opposing back surface, a plurality of throughholes extending therethrough from said back surface to said front surface, and optical fibers each extending through a respective one of said throughholes and having a front end portion exposed at said front surface of said main body;
   polishing said front surface of said main body with a textile pad free of abrading particles affixed thereto and a first slurry, said textile pad etching said front surface preferentially relative to said optical fibers such that the front end portions of said optical fibers protrude beyond the preferentially etched front surface of said main body; and
   thereafter polishing said front portions of said optical fibers with a porous and compressive sponge-like material without abrading particles affixed thereto and a second slurry such that said front end portions of said optical fibers protrude beyond said preferentially etched front surface of said main body by lengths with variations which are within a specified value about an average length.

2. The method of claim 1 wherein said average length is over 1 micron.

3. The method of claim 2 wherein said average length is over 3 microns.

4. The method of claim 3 wherein said specified value is 0.5 microns.

5. The method of claim 4 wherein said optical fibers are arranged linearly through said main body and the maximum difference between the protruding lengths of a mutually adjacent pair of said optical fibers is less than 0.2 microns.

6. The method of claim 2 wherein said specified value is 0.5 microns.

7. The method of claim 6 wherein said optical fibers are arranged linearly through said main body and the maximum difference between the protruding lengths of a mutually adjacent pair of said optical fibers is less than 0.2 microns.

8. The method of claim 2 wherein said textile pad comprises nylon and said first slurry includes abrading particles with average diameter in the range of 3–5 microns.

9. The method of claim 1 wherein said textile pad comprises nylon and said first slurry includes abrading particles with average diameter in the range of 3–5 microns.

10. The method of claim 9 wherein said sponge-like material is polyurethane with hardness between 20–80 duro, having pores with sizes between 20–100 microns.

11. The method of claim 10 wherein said second slurry includes abrading particles with average diameter in the range of 0.1–2.0 microns.

12. The method of claim 11 wherein front surfaces of said optical fibers have surface roughness $R_a$ of less than 2 nm after being polished by said sponge-like material.

13. The method of claim 1 wherein said sponge-like material is polyurethane with hardness between 20–80 duro, having pores with sizes between 20–100 microns.

14. The method of claim 13 wherein said second slurry includes abrading particles with average diameter in the range of 0.1–2.0 microns.

15. The method of claim 14 wherein front surfaces of said optical fibers have surface roughness $R_a$ of less than 2 nm after being polished by said sponge-like material.

* * * * *